Oct. 21, 1969  E. P. BRANE  3,473,481

VENTURI ARRANGEMENT

Filed March 18, 1966

INVENTOR
EARL P. BRANE
BY
Woodard, Weikart, Emhardt & Naughton
Attorneys

United States Patent Office 3,473,481
Patented Oct. 21, 1969

3,473,481
VENTURI ARRANGEMENT
Earl P. Brane, Largo, Fla., assignor to Borgerud Mfg. Co., Inc., Deerfield, Wis., a corporation of Wisconsin
Filed Mar. 18, 1966, Ser. No. 535,606
Int. Cl. F04f 5/10; B05b 7/26
U.S. Cl. 103—262
3 Claims

ABSTRACT OF THE DISCLOSURE

A venturi arrangement with resilient flow control means, a baffle in an enlarged portion between the flow control means and the constricted throat, and an intake passage which opens at the constricted throat. A constant rate of flow through the venturi and a constant rate of intake is maintained in spite of variations in pressure.

---

The present invention relates to a venturi arrangement particularly useful in water softener systems or valves.

In my copending application Ser. No. 401,376, now Patent No. 3,348,574 entitled Compact Water Softener Valve Structure, there is disclosed a water softener system which incorporates a venturi element. This venturi element functions to suck brine from a brine tank and to mix the brine with the water flowing through the main passage of the venturi element. It is desirable that water flow through the venturi and that brine be sucked into the venturi at a constant rate and proportion no matter what the water pressure is at the upstream end of the venturi. In many present day suburban homes and in most farm homes, water is supplied to the storage tank of the home by means of an automatic pump which pumps the water from a well. The automatic pump is controlled according to the pressure of the water in the storage tank. Thus, the pressure might vary, for example, from 20 p.s.i.g. to 40 p.s.i.g. as pressure values at which the pump is turned on and turned off, respectively.

Assuming now that the water softener of my copending application is supplied with water at a pressure varying between such values, the flow of water through the venturi will not be constant and instead will vary greatly. Also, the amount of brine sucked into the water moving through the venturi will vary greatly and will not necessarily maintain the same ratio to the amount of water moving through the venturi. It is therefore an important object of the present invention to provide a venturi arrangement capable of maintaining a constant rate of flow of liquid through the main passage of the venturi and capable of maintaining a constant rate of mixing of the liquid flowing through the main passage and liquid being sucked into the venturi through a passage at the neck thereof.

Another object of the invention is to provide an improved venturi arrangement.

Related objects and advantages will become apparent as the description proceeds.

One embodiment of the present invention might include a venturi arrangement comprising a body having a first passage therethrough, said passage having a constricted throat, said body having a second passage therethrough which opens at said constricted throat, said body having a seat formed in said passage, a resilient annular member received in said seat and deflectable by fluid pressure to reduce the size of the opening through said annular member for controlling fluid flow therethrough, and a baffle positioned in said passage between said annular member and said constricted throat.

The full nature of the invention will be understood from the accompanying drawings and the following description and claims.

Figure 1:
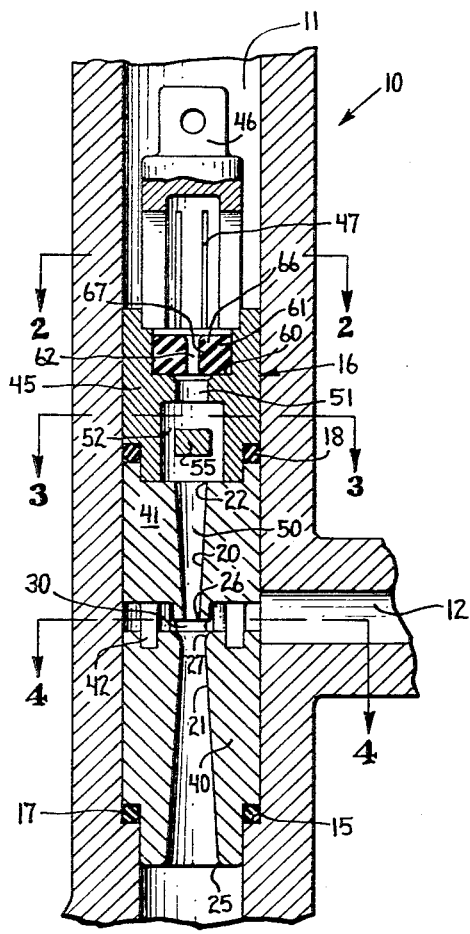
FIG. 1 is an axial section of a venturi arrangement embodying the present invention.
Figure 2:
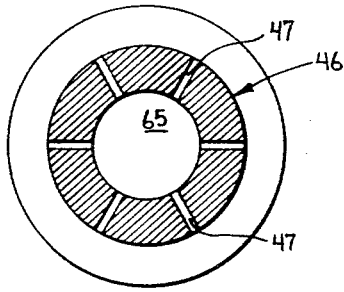
FIG. 2 is an enlarged transverse section taken along the line 2—2 of FIG. 1 in the direction of the arrows.
Figure 3:
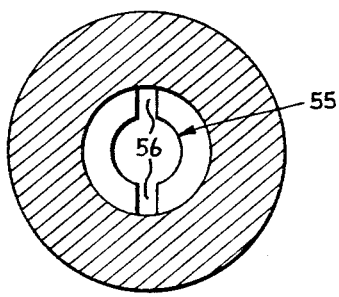
FIG. 3 is an enlarged transverse section taken along the line 3—3 of FIG. 1 in the direction of the arrows.
Figure 4:
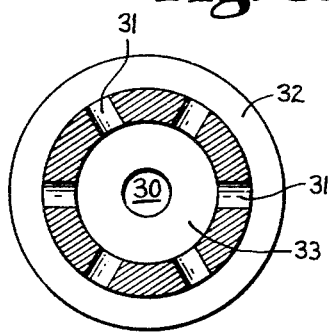
FIG. 4 is an enlarged transverse section taken along the line 4—4 of FIG. 1 in the direction of the arrows.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawing, there is illustrated a housing 10 which may correspond to the water softening valve of my above mentioned patent. The housing 10 has a passage 11 extending therethrough, said passage 11 having a passage 12 opening thereinto. The passages 11 and 12 may correspond to the passages 130 and 140 of my above mentioned patent. The passage 11 is formed with a shoulder 15 against which a body 16 is seated. The body 16 may be provided with suitable sealing means 17 and 18 in order to seal the upper portion of the passage 11 from the lower portion thereof and so as to cause all water flow from the upper portion of the passage to flow through the body 16 to the lower portion of the passage 11. The sealing means 17 and 18 also function to seal off flow from the passage 12 outside of the body 16, either to the upper portion or to the lower portion of the passage 11.

The body 16 has a venturi passage or passages 20 and 21 formed therein. Each of the passages 20 and 21 has a frustoconical shape and tapers from a larger diameter at 22 and 25, respectively, to a smaller diameter at 26 and 27. Between the venturi passages 20 and 21 there is a constricted throat 30. A plurality of radially extending passages 31 communicate between an outer annular passage 32 and an inner annular passage 33 which in turn communicates with the throat 30. The passage 12 opens into the passage 32. It can be appreciated, therefore, that downward flow of fluid through the body 16 and through the passages 20 and 21 causes liquid to be sucked into the downward flow from the passage 12 through the passages 31, 32 and 33 into the throat 30 where the fluid from the passage 12 mixes with the fluid flowing downwardly through the passages 20 and 21 and, thus, becomes a part of the fluid as it leaves the passage 21 from the lower end 25 thereof.

As shown in the drawings, the body 16 consists of a lower member 40 which has a member 41 secured thereto by means of projections 42 which also form the passages 31. A further member 45 also forms a part of the body 16 and is secured to the member 41. The member 45 has fixed thereto a further member 46 which operates as a strainer to prevent undesired objects from entering into the body 16. The member 46 includes a plurality of radially inwardly extending passages 47 which are relatively narrow so as to block undesired objects.

The entire passage through the body 16 including the passages 20 and 21 is herein referred to as the passage 50. This passage 50 includes the reduced sized portion 20 as well as a further reduced sized portion 51 with an enlarged portion 52 being positioned between the reduced sized portions 51 and 20. Fixedly mounted within the enlarged portion 52 of the passage 50 is a baffle 55. The baffle 55 has a cylindrical shape which is connected or mounted to the member 45 by webs 56. It can be seen that the baffle 55 is sufficiently large in size to block all straight line access between the reduced sized portions 51 and 20. In other words, a straight line cannot be drawn from the reduced sized portion 51 to the reduced sized portion 20 without intersecting the baffle 55. This, of course, means that all flow out of the reduced sized portion 51 must move around the baffle 55 and thus is caused to make substantial changes in direction.

The passage 50 further includes a countersunk portion 60 within which is received a flexible resilient annular member 61. The member 61 has an opening 62 through the center thereof which varies in size depending upon the pressure of the liquid attempting to move through the opening 62. Thus, liquid moves through the passage 50 from the passage 11 through the passages 47 into the passage 65 inside of the member 46 thence downwardly through the opening 62 and the rest of the passage 50. When the pressure of the water within the passage 11 becomes appreciably greater, this pressure is exerted upon the upper portion 66 of the annular element 61 and causes the inner portion 67 of the annular element to bend downwardly reducing the size of the opening 62, particularly at the upper end thereof. This change in configuration and reduced size of the opening 62 has the effect of cutting down the flow of fluid through the annular member 61 and thus tends to keep the flow of fluid through the body 16 at a constant value even though the pressure in the upper portion of the passage 11 varies considerably. (A flow control identical or similar to the annular member 61 is disclosed in U.S. Patent 2,454,929 and U.S. Patent 2,389,134.)

It has been found, however, that without the baffle 55, the liquid flowing through the annular member 61 tends to rush through the venturi neck or constricted throat 30 without producing a proper venturi effect. Thus, the desired constant flow of fluid from the passage 12 into the passage 50 is not maintained when the baffle 55 is not present. The effect of the baffle, however, together with the effect of the increased sized portion 52 of the passage 50 is to cause the passage 50 to be filled with the liquid so that the venturi operates properly to maintain a constant rate of intake from the passage 12.

It will be evident from the above description that the present invention provides an improved venturi arrangement which is capable of maintaining a constant rate of mixing of liquid flowing through the main passage of a venturi and liquid being sucked into the venturi, even though the pressure of the incoming main passage liquid is varied through a considerable range.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A venturi arrangement comprising a body having a first passage therethrough, said passage having a constricted throat, said body having a second passage therethrough which opens at said constricted throat, said body having a seat formed in said passage, a resilient annular member received in said seat and deflectable by fluid pressure to reduce the size of the opening through said annular member for controlling fluid flow therethrough, said first passage having an enlarged portion between said resilient annular member and said throat, and a baffle positioned in said enlarged portion of said first passage between said annular member and said constricted throat wherein said baffle is mounted on said body by a pair of radially extending webs, said first passage having reduced portions at the upstream and downstream ends of said enlarged portion, said reduced portions being between said throat and said resilient annular member, said baffle being positioned to intercept all straight line flow from said annular member through said constricted throat, whereby said constricted throat is substantially filled with fluid under normal flow conditions.

2. The venturi arrangement of claim 1 wherein said baffle is cylindrical in shape.

3. The venturi arrangement of claim 1 wherein said first passage tapers in frustoconical configuration to and from said throat, said body having a plurality of passages leading radially inwardly to said constricted throat, said body also incorporating strainer means, said resilient flexible annular member being positioned between said constricted throat and said strainer means.

References Cited

UNITED STATES PATENTS

| | | | |
|---|---|---|---|
| 2,264,539 | 12/1941 | Lindstaedt | 137—604 X |
| 2,690,717 | 10/1954 | Goodrie | 239—318 X |
| 2,764,452 | 9/1956 | Anderson et al. | 239—310 |
| 2,766,910 | 10/1956 | Bauerlein | 239—318 X |
| 3,194,254 | 7/1965 | Zmek | 137—604 X |

FOREIGN PATENTS 1,101,076 3/1961 Germany.

WILLIAM F. O'DEA, Primary Examiner

DENNIS H. LAMBERT, Assistant Examiner

U.S. Cl. X.R.

137—604; 239—310; 251—127